United States Patent
Neitzell (12)

(10) Patent No.: US 6,508,151 B1
(45) Date of Patent: *Jan. 21, 2003

(54) RECIPROCATING SAW WITH ROCKER MOTION

(75) Inventor: Roger D. Neitzell, North Prairie, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/474,033

(22) Filed: Dec. 28, 1999

Related U.S. Application Data

(63) Continuation of application No. 09/020,436, filed on Feb. 9, 1998, now abandoned, which is a continuation of application No. 08/699,448, filed on Aug. 19, 1996, now abandoned.

(51) Int. Cl.[7] .......................... B27B 19/09; B23D 49/16; B23D 51/16
(52) U.S. Cl. ................. 83/34; 30/393; 30/394
(58) Field of Search ............... 83/13, 34; 30/392, 30/393, 394, 372, 324; 173/95, 96, 94, 97, 114, 49

(56) References Cited

U.S. PATENT DOCUMENTS

| | | | |
|---|---|---|---|
| 1,349,661 A | 8/1920 | Buhl | |
| 3,155,128 A | * 11/1964 | Godfrey et al. | 30/394 X |
| 3,204,470 A | 9/1965 | Brucker | |
| 3,206,989 A | 9/1965 | Enders | 30/392 X |
| 3,236,111 A | 2/1966 | Naslund | 30/392 X |
| 3,269,197 A | 8/1966 | Enders | |
| 3,388,728 A | 6/1968 | Riley, Jr. et al. | 30/392 |
| 3,461,732 A | 8/1969 | Gregory | 30/393 X |
| 3,542,097 A | 11/1970 | Dudek et al. | 30/392 |
| 3,802,079 A | 4/1974 | Ketchpel, Jr. et al. | 30/394 X |
| 3,942,251 A | 3/1976 | Griffies et al. | |
| 3,945,120 A | 3/1976 | Ritz | 30/393 |
| 3,971,132 A | 7/1976 | Griffies et al. | 30/393 |
| 4,137,632 A | 2/1979 | Pfanzer | 30/393 |
| 4,238,884 A | 12/1980 | Walton, II | 30/393 |
| 4,255,858 A | 3/1981 | Getts | 30/393 |
| 4,262,421 A | 4/1981 | Bergler et al. | 30/393 |
| 4,385,443 A | 5/1983 | O'Banion | 30/393 |
| 4,545,123 A | 10/1985 | Hartmann | 30/393 |
| 4,550,501 A | 11/1985 | Moores, Jr. et al. | 30/393 |

(List continued on next page.)

FOREIGN PATENT DOCUMENTS

| | | | |
|---|---|---|---|
| CA | 696682 | 9/1964 | 30/392 |
| DE | 744918 | 11/1943 | 173/95 |
| WO | WO98/07544 | 2/1998 | |

Primary Examiner—Charles Goodman
(74) Attorney, Agent, or Firm—Michael Best & Friedrich LLP

(57) ABSTRACT

A method of reciprocating a spindle of a reciprocating saw, including the steps of reciprocating the front end of the spindle along a first path during the cutting stroke and along the same first path during the return stroke, and adjusting the saw such that the front end reciprocates along a second path during the cutting stroke and along the same second path during the return stroke, the second path being oblique to the first path. The present invention also provides a method of reciprocating a spindle of a reciprocating saw, including the steps of moving the front end along a first cutting path during the cutting stroke, the first cutting path characterized by movement at least partially in a first cutting direction, returning the front end along a return stroke (e.g., along the first cutting path), and adjusting the saw such that the front end moves along a second cutting path during the cutting stroke, the second cutting path characterized by movement at least partially in a second cutting direction.

14 Claims, 6 Drawing Sheets

U.S. PATENT DOCUMENTS

| | | |
|---|---|---|
| 4,628,605 A | 12/1986 | Clowers .................. 30/393 |
| 4,962,588 A | 10/1990 | Fushiya et al. ............ 30/372 |
| 5,009,012 A | 4/1991 | Martinez et al. ............ 30/394 |
| 5,025,562 A | 6/1991 | Palm .................. 30/393 X |
| 5,050,307 A | 9/1991 | Palm .................. 30/392 |
| 5,079,844 A | 1/1992 | Palm .................. 30/393 X |
| 5,099,705 A | 3/1992 | Dravnieks ............. 30/394 X |
| 5,165,173 A | 11/1992 | Miller ................. 30/394 X |
| 5,212,887 A | 5/1993 | Farmerie ............... 30/393 |
| 5,392,519 A | 2/1995 | Inoue et al. ............ 30/393 |
| 5,479,711 A | 1/1996 | Hathcock .............. 30/393 |
| 5,555,626 A | 9/1996 | Fuchs ................. 30/392 X |
| 5,832,611 A | 11/1998 | Schmitz |
| 5,940,977 A | 8/1999 | Moores, Jr. |

* cited by examiner

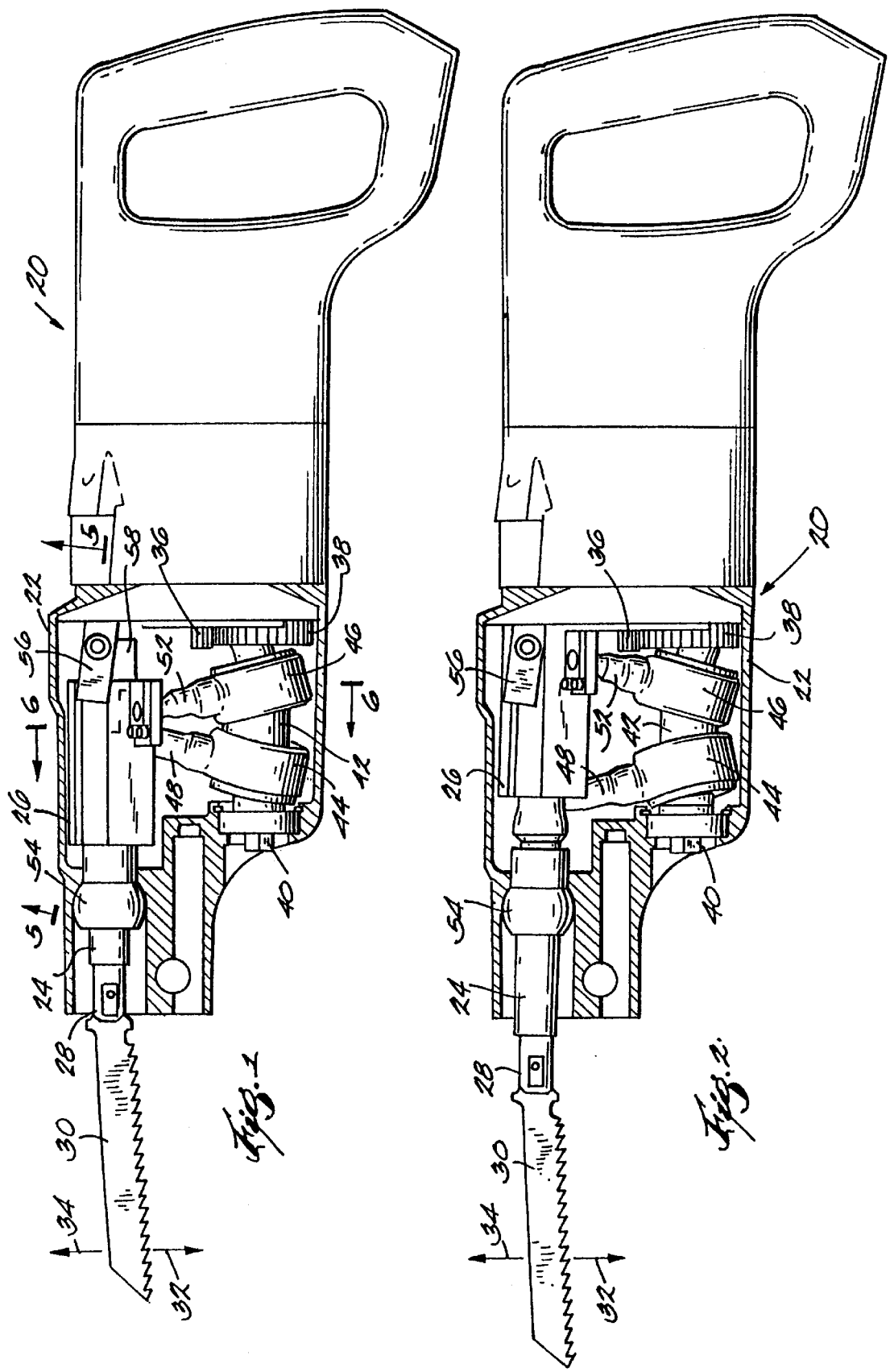

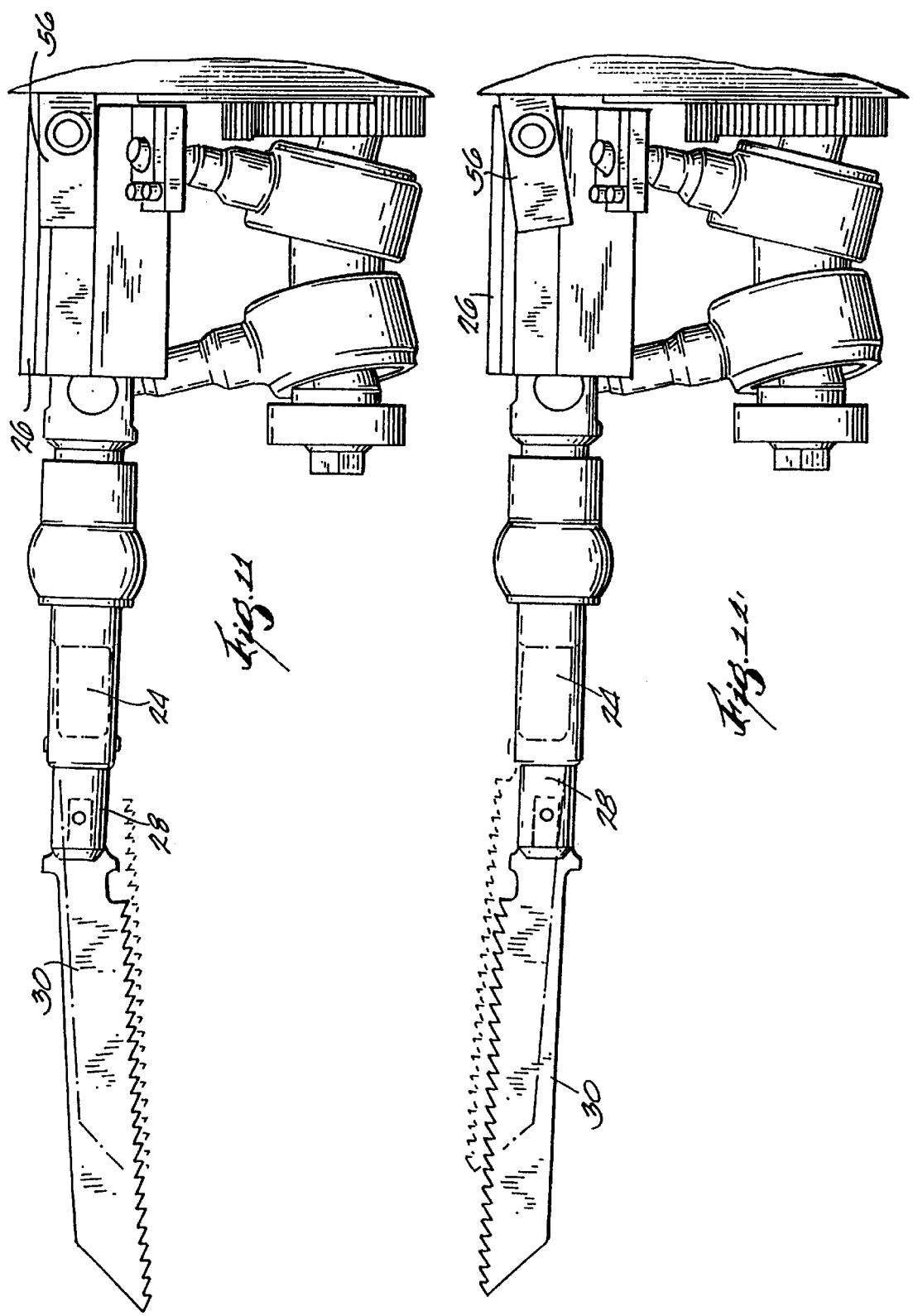

RECIPROCATING SAW WITH ROCKER MOTION

RELATED APPLICATION

This is a continuation of application Ser. No. 09/020,436, filed Feb. 9, 1998, now abandoned, which is a continuation of application Ser. No. 08/699,448, filed Aug. 19, 1996, now abandoned.

FIELD OF THE INVENTION

The present invention generally relates to the field of reciprocating saws.

BACKGROUND OF THE INVENTION

Reciprocating saws are used to cut a variety of objects, such as metal pipes, wood and drywall. Such saws typically include a housing and a spindle mounted in the housing for reciprocating motion along an axis that is parallel to the longitudinal extent of the spindle. An electric motor provides power to the spindle through a mechanical reciprocating device that converts the rotary motion of a motor shaft to reciprocating motion. Such mechanical reciprocating devices can, for example, include an eccentric drive, as disclosed in U.S. Pat. No. 5,079,844, or a wobble plate drive, as disclosed in U.S. Pat. Nos. 5,025,562 and 5,050,307.

In some reciprocating saws, the spindle reciprocates in an orbital motion as opposed to a straight line reciprocating motion. The orbital motion is characterized by a forward (i.e., in the cutting direction) motion of the saw blade as the saw blade is being retracted toward the saw on the cutting stroke, and a corresponding rearward (i.e., opposite the cutting direction) motion of the saw blade as the saw blade is being extended away from the saw on the return stroke. The result is a circuitous, or orbital, path of the saw blade. Such orbital motion is believed to improve the speed at which the saw cuts a workpiece by driving the saw blade into the workpiece during the cutting stroke and withdrawing the saw blade from the workpiece during the return stroke.

Orbital motion has been achieved in a number of different ways. For example, in U.S. Pat. Nos. 4,238,884 and 4,628,605, a forward force (in the cutting direction) is applied by a blade roller directly to the saw blade during the cutting stroke, and forward motion of the saw blade is accommodated by a forgiving interconnection between the spindle and the drive mechanism. In U.S. Pat. No. 5,212,887, the spindle reciprocates through a pivotally-mounted bushing, and the back end of the spindle is connected to an eccentric member that provides forward-rearward motion to the spindle. In U.S. Pat. Nos. 4,962,588 and 4,550,501, the back end of the spindle is moved forward-rearward by connection to a cam surface on a rotating gear, and in U.S. Pat. No. 5,392,519 the back end of the spindle in moved forward-rearward by connection to an eccentric member.

SUMMARY OF THE INVENTION

The utilization of blade rollers, cam surfaces, and eccentric members can be unnecessarily complicated and expensive. Further, such devices tend to wear down, and some can introduce unwanted vibrations into the saw. Accordingly, it is an object of the present invention to provide a saw that approaches the better cutting performance of orbital saws without the complexity required for orbital motion. It is a related object of the present invention to achieve a forward motion of the saw blade during the cutting stroke without resorting to orbital motion.

The above-noted objects are achieved by a method of reciprocating a spindle of a reciprocating saw, the spindle having a front end adapted to receive a saw blade movable through a cutting stroke and a return stroke. The method comprises the steps of reciprocating the front end along a first path (e.g., a neutral path) during the cutting stroke and along the same first path during the return stroke, and adjusting the saw such that the front end reciprocates along a second path during the cutting stroke and along the same second path during the return stroke. The second path is oblique to the first path. By virtue of this method, the front end of the spindle follows a path that is not orbital, and therefore can be achieved using a much simpler mechanism. In addition, the front end of the spindle can be moved in a neutral path or, alternatively, in an oblique path that plunges into the workpiece.

In another aspect, the present invention provides a method of reciprocating a spindle of a reciprocating saw, the spindle having a first cutting direction and a second cutting direction opposite the first cutting direction. The method comprises the steps of moving the front end along a first cutting path during the cutting stroke, the first cutting path characterized by movement at least partially in the first cutting direction, returning the front end along a return stroke (e.g., along the first cutting path), and adjusting the saw such that the front end moves along a second cutting path during the cutting stroke, the second cutting path characterized by movement at least partially in the second cutting direction. Preferably, the saw can also be adjusted such that the front end moves along a neutral cutting path during the cutting stroke, the neutral cutting path characterized by movement substantially perpendicular to the first and second cutting directions. By virtue of this method, the saw can be used to achieve a plunge cut in either down-cutting or up-cutting situations.

BRIEF DESCRIPTION OF THE DRAWINGS

FIG. 1 is a partial side section view of a reciprocating saw embodying the present invention with the guide member in a down-cutting position and the spindle in a fully retracted position.

FIG. 2 is the partial side section view of FIG. 1 with the spindle in a fully extended position.

FIG. 11 is a partial side view of the internal drive components of the reciprocating saw of FIG. 1 with the guide member in a neutral or non-rocking position.

FIG. 12 is a partial side view of the internal drive components of the reciprocating saw of FIG. 1 with the guide member in an up-cutting position.

DETAILED DESCRIPTION

Figure 3:
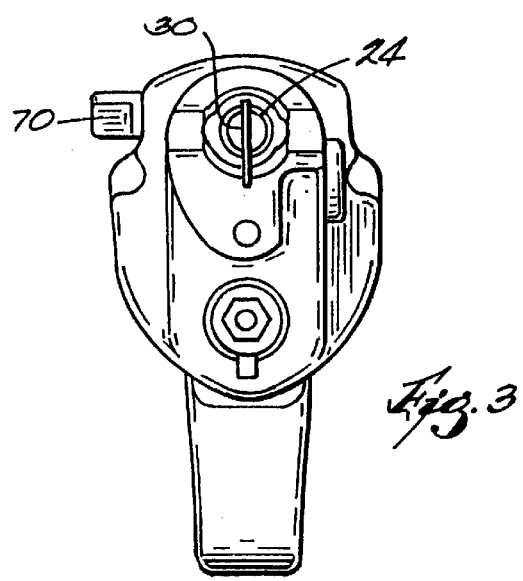
FIG. 3 is a front view of the reciprocating saw shown in FIG. 1.
Figure 4:
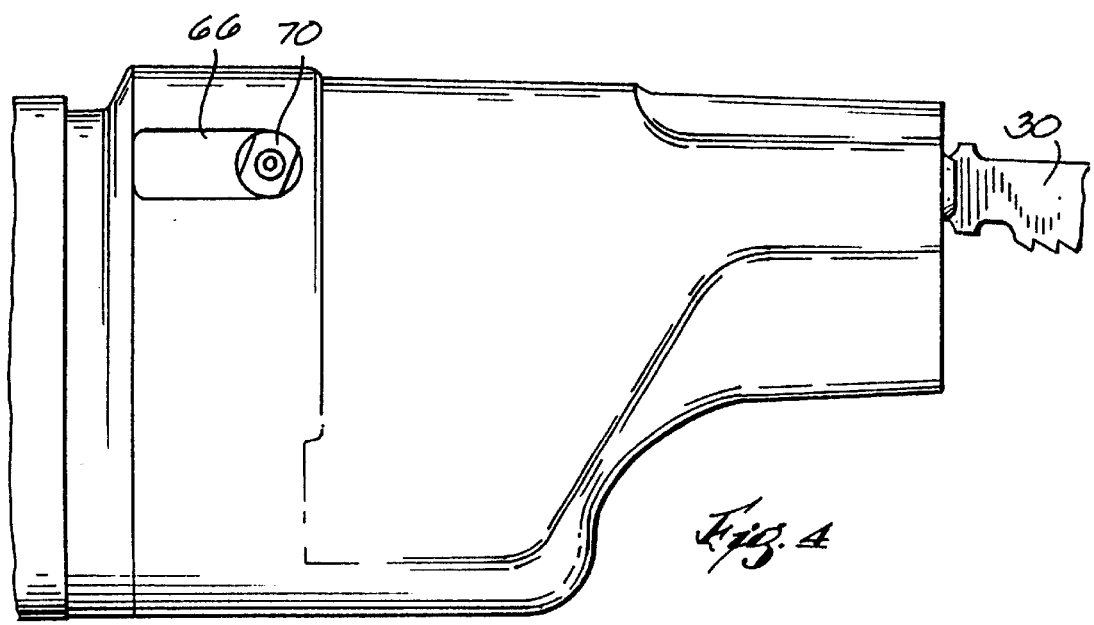
FIG. 4 is a partial right side view of the reciprocating saw shown in FIG. 1.

FIGS. 1 and 2 illustrate a reciprocating saw 20 embodying the present invention. The reciprocating saw 20 generally includes a main housing 22, a spindle 24 reciprocatably mounted within the housing 22, and a counterweight 26 reciprocatably mounted with the housing 22. The spindle 24 includes a front end 28 that supports a saw blade 30, which is designed to cut in a cutting direction 32 (i.e., in the direction of the saw teeth) opposite a non-cutting direction 34. The spindle 24 reciprocates the saw blade 30 through a cutting stroke (usually toward the housing 22) and a return stroke (usually away from the housing 22). The counterweight 26 provides a vibration-reducing force that at least partially counteracts the forces created by movement of the spindle 24 and the saw blade 30.

A drive means in the form of an electric motor (not shown) is mounted in the housing 22. The motor includes a drive pinion 36 that engages a gear 38 mounted on a jack shaft 40 that is rotatably mounted within the housing 22. A wobble shaft 42 is positioned over the jack shaft 40 and is designed to drive primary and secondary wobble plates 44,46 in a conventional manner. The primary wobble plate 44 includes a primary drive arm 48 that extends through a slot 50 (FIG. 6) in the counterweight 26 to drivingly engage the reciprocating spindle 24. The secondary wobble plate 46 includes a secondary drive arm 52 that drivingly engages the counterweight 26.

In addition to being mounted for reciprocating motion, the reciprocating spindle 24 is also mounted for rocking motion relative to the housing 22. Such rocking motion is facilitated by a spherical bearing sleeve 54 pivotably mounted within the housing 22. The spherical bearing sleeve 54 rocks relative to the housing 22, and the reciprocating spindle 24 reciprocates through the bearing sleeve 54. In should be appreciated that, instead of a spherical bearing sleeve 54, the bearing sleeve 54 could comprise a plane bearing sleeve mounted to the housing 22 for pivoting motion about a horizontal axis.

The illustrated reciprocating spindle 24 is designed to move in three distinct motions: a down-cutting rocking motion, a neutral or non-rocking motion, and an up-cutting rocking motion. FIGS. 1 and 2 illustrate the down-cutting rocking motion. Such motion is generated due to the interconnection between the spindle 24 and an inclined track member 56. Such interconnection is provided by the interconnection between a rear end 58 of the spindle 24 and the counterweight 26, and further by the interconnection between the counterweight 26 and the inclined track member 56. More specifically, the rear end 58 of the spindle 24 is designed to be supported by and to slide within the counterweight 26. Accordingly, any oblique motion (i.e., angled relative to the longitudinal extent of the reciprocating spindle 24) of the counterweight 26 will result in oblique motion of the rear end of the spindle 24 and rocking motion of the spindle 24 about the spherical bearing sleeve 54.

Figure 5:
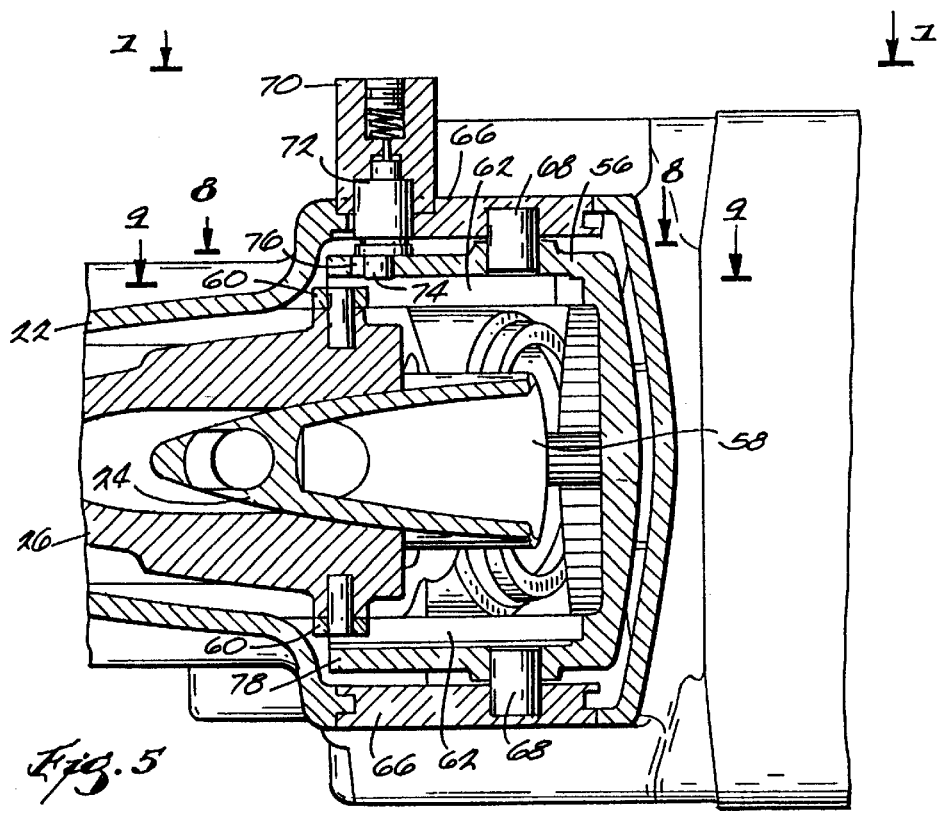
FIG. 5 is a section view taken along line 5—5 in FIG. 1.

Referring to FIG. 5, in addition to riding on the reciprocating spindle 24, the counterweight 26 is slidably interconnected with the track member 56. In this regard, two follower members in the form of bearings 60 are secured to opposing sides of the counterweight 26 and slidably engage a slot 62 in the track member 56. Because the track member 56 is inclined relative to the longitudinal extent of the counterweight 26 (as shown in FIG. 1), the sliding interaction between the counterweight 26 and the track member 56 will result in oblique movement of the counterweight 26 as the counterweight 26 is reciprocated within the housing 22. More specifically, as the counterweight 26 is moved from the position shown in FIG. 1 to the position shown in FIG. 2, the counterweight 26 moves downwardly (as viewed in FIGS. 1 and 2) within the housing 22, resulting in upward movement of both the front end 28 of the spindle 24 and the corresponding saw blade 30. During this upward movement of the saw blade 30, the spindle 24 is being extended. As the spindle 24 is being retracted, the counterweight 26 is extended and moved upward slightly, following the track member 56. Such upward movement of the counterweight 26 results in downward movement of the saw blade 30. Accordingly, it can be seen that the saw blade 30 moves downward slightly (i.e., in the cutting direction 32) during the cutting stroke, and upward slightly (i.e., in the non-cutting direction 34) during the return stroke. However, the cutting stroke and return stroke occur along the same path, and therefore the path of the saw blade 30 is not orbital.

In the illustrated embodiment, the slot 62 in the track member 56 is substantially linear. Alternatively, the slot could be curved.

Figure 6:
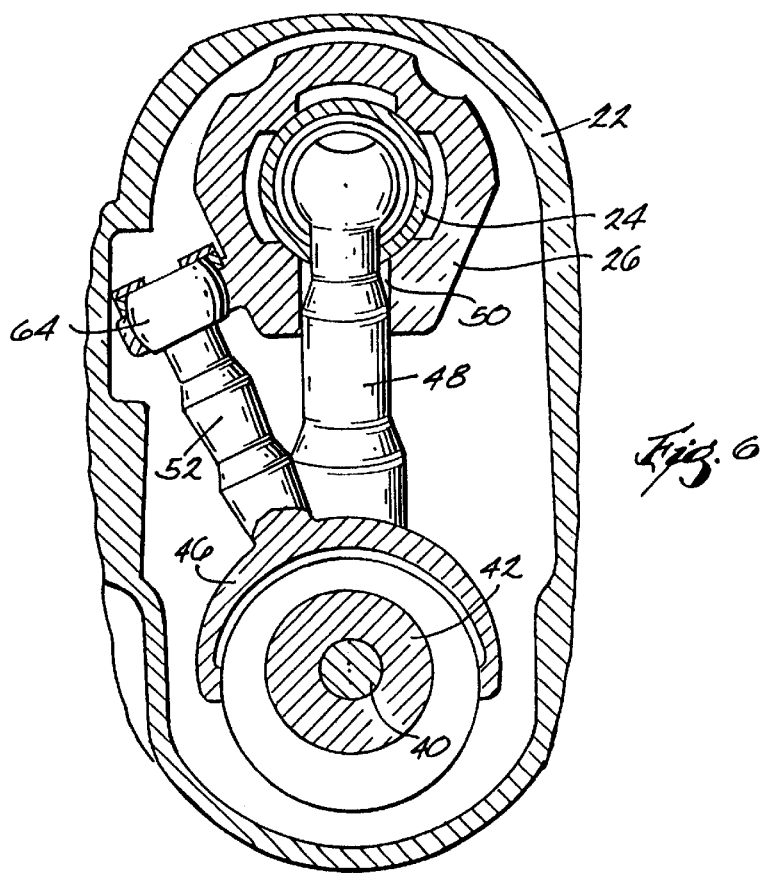
FIG. 6 is a section view taken along line 6—6 in FIG. 1.
Figure 7:
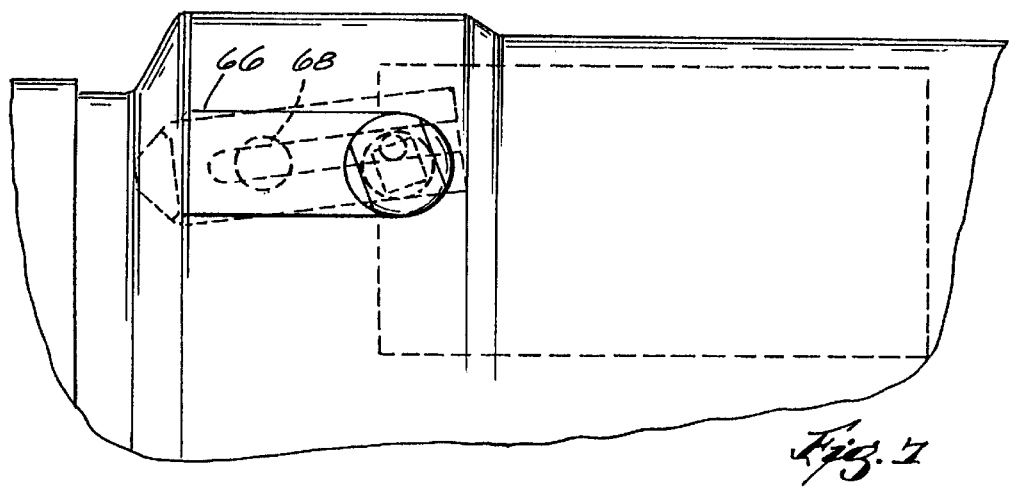
FIG. 7 is a right side view of the reciprocating saw taken along line 7—7 in FIG. 5.
Figure 8:
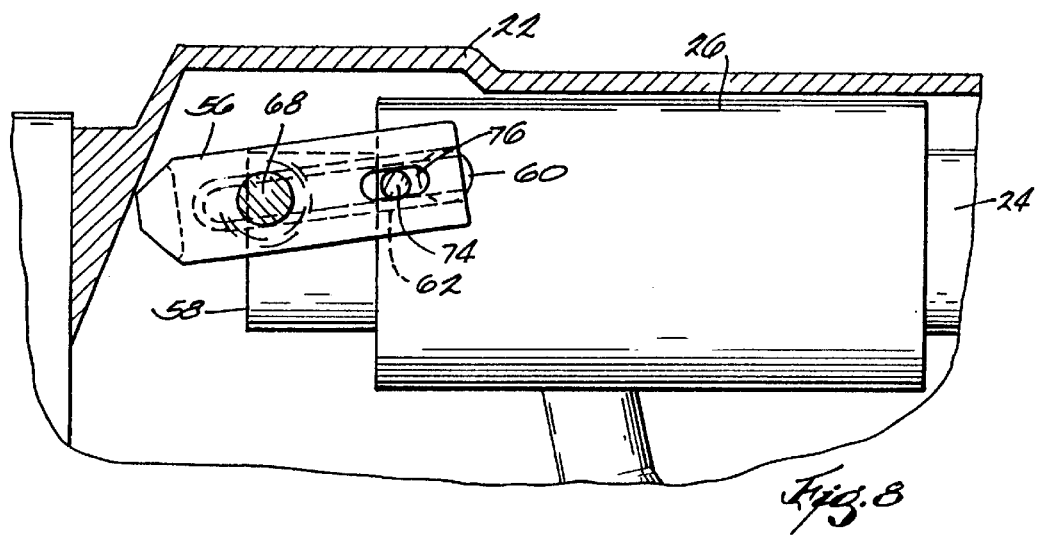
FIG. 8 is a section view taken along line 8—8 in FIG. 5.
Figure 9:
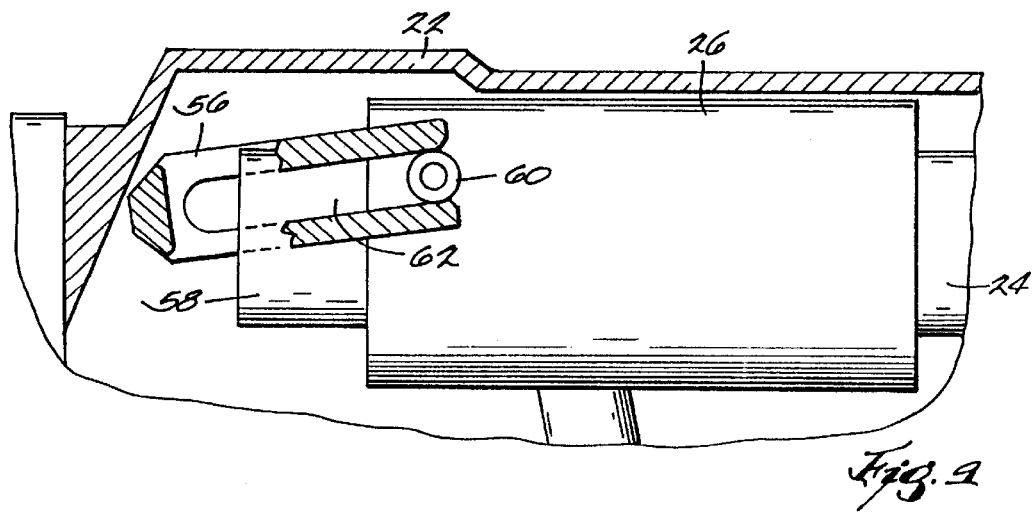
FIG. 9 is a section view taken along line 9—9 in FIG. 5.

Turning to FIG. 6, in order to accommodate oblique movement of the counterweight 26, the interconnection between the secondary drive arm 52 and the counterweight 26 is provided by a spherical slide bearing 64. More specifically, the spherical slide bearing 64 provides for rocking motion between the secondary drive arm 52 and the counterweight 26, and the secondary drive arm 52 is also slidable within the spherical slide bearing 64 to accommodate transverse movement of the counterweight 26 relative to the secondary drive arm 52. Similarly, the primary drive arm 48 is interconnected with the spindle 24 by a spherical slide bearing (not shown).

In order to allow the path of the saw blade 30 to be adjusted, the angle of the track member 56 is adjustable. More specifically, referring to FIGS. 3–5 and 7–9, the track member 56 is pivotally mounted to a housing insert 66 by a pivot member 68. Adjustment of the angle of the track member 56 is accomplished by rotating an adjustment knob 70. The adjustment knob 70 can be rotated to provide rotation to an eccentric cam member 72 having an eccentric pin 74 that slidably engages an adjustment slot 76 in the track member 56. As the eccentric cam member 72 is rotated, the eccentric pin 74 provides transverse movement to the front end 78 of the track member 56, thereby causing rotation of the track member 56 about the pivot member 68.

Figure 10:
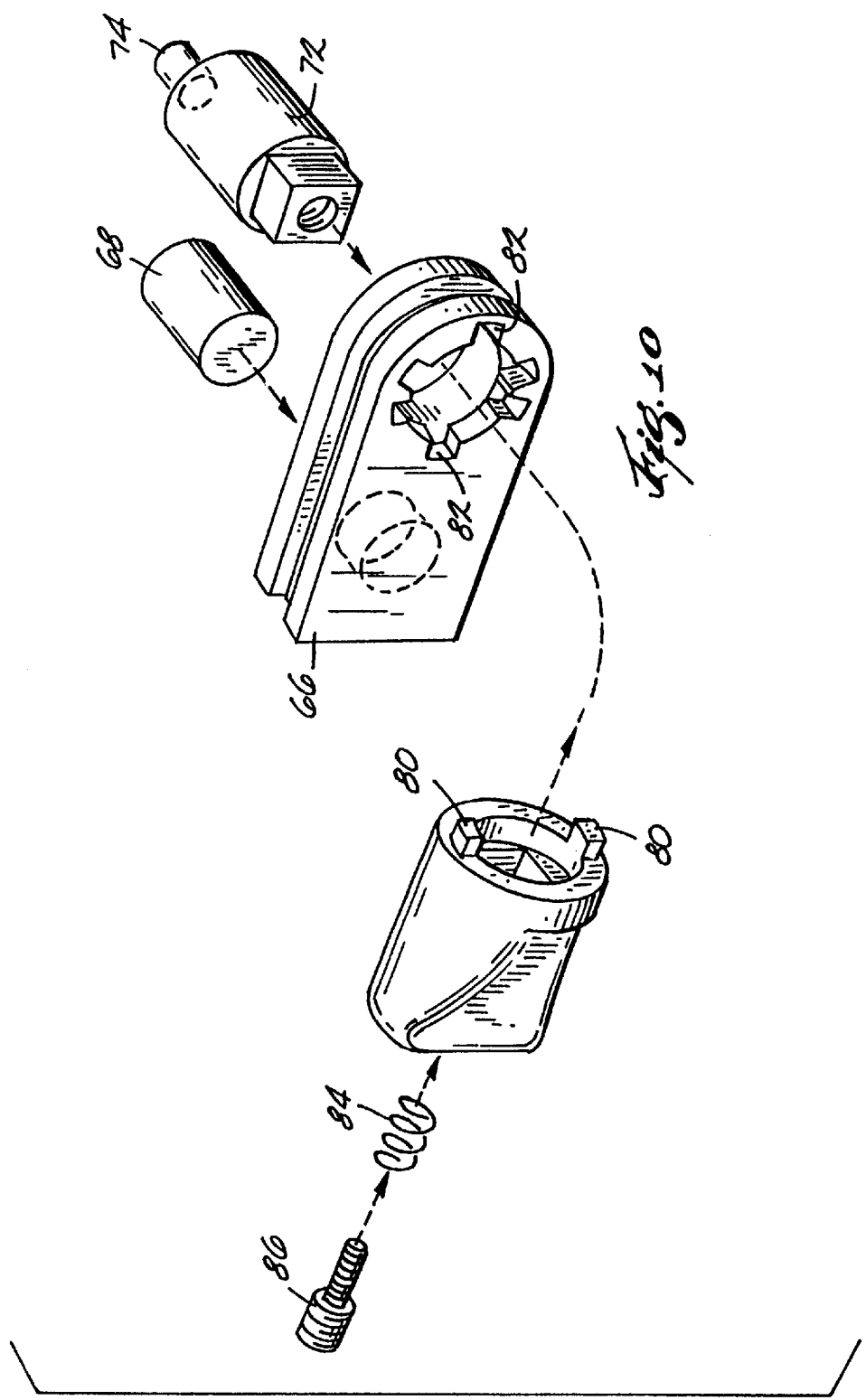
FIG. 10 is a perspective assembly view of the housing insert, follower member, eccentric cam member and adjustment knob.

Referring to FIG. 10, to secure the position of the track member 56, the adjustment knob 70 is provided with two teeth 80 designed to selectively engage three pairs of corresponding recesses 82 in the housing insert 66. The adjustment knob 70 is biased toward the housing insert 66 by a spring 84 and a corresponding spring stop 86 secured to the eccentric cam member 72. Rotation of the adjustment knob 70 is accomplished by pulling the adjustment knob 70 away from the housing insert 66 until the teeth 80 are disengaged from the recesses 82 in the housing insert 66. Subsequently, the adjustment knob 70 can be rotated until the teeth 80 are aligned with a different pair of recesses 82. The adjustment knob 70 can then be released whereby the spring 84 will force the adjustment knob 70 and corresponding teeth 80 toward the housing insert 66 and into the corresponding recesses 82. The positions of the three pairs of recesses 82 in the housing insert 66 correspond with the three desired motions of the saw blade 30: down-cutting rocking motion, neutral or non-rocking motion, and up-cutting rocking motion.

FIG. 11 illustrates the reciprocating saw 20 with the track member 56 in the neutral or non-rocking position, resulting in movement of the front end 28 of the reciprocating spindle 24 in a path different than described above with respect to FIG. 1. Such positioning of the track member 56 is accomplished by rotating the adjustment knob 70, as described above in more detail. With the track member 56 in this position, the counterweight 26 and spindle 24 will not significantly rock about the spherical bearing sleeve 54, thereby resulting in a neutral or non-rocking motion of the saw blade 30. The neutral motion of the saw blade 30 is generally illustrated in FIG. 11 with the fully extended position of the saw blade 30 shown in solid lines and the filly retracted position of the saw blade 30 shown in broken lines. With the track member 56 in this position, the reciprocating saw 20 can be used for either up-cutting (as illustrated) or down-cutting.

FIG. 12 illustrates the reciprocating saw 20 with the track member 56 positioned in an up-cutting rocking position, resulting in movement of the front end 28 of the reciprocating spindle 24 in a path different than described above with respect to FIGS. 1 and 11. As noted above, such positioning of the track member 56 is accomplished by rotating the adjustment knob 70 to the appropriate position. With the track member 56 in this position, the saw blade 30 will follow the illustrated path, with the fully extended position of the saw blade 30 shown in solid lines and the fully retracted position of the saw blade 30 shown in broken lines. With the track member 56 in this position, the reciprocating saw 20 can be used for up-cutting in a cutting direction opposite that shown in FIG. 1.

To summarize, the down-cutting rocking motion of the saw blade 32 is illustrated in FIGS. 1 and 2. During the cutting stroke (moving from the position shown in FIG. 2 to the position shown in FIG. 1), the spindle 24 is retracted, and the counterweight 26 moves upwardly along the track member 56. As a result, a point on the saw blade (e.g., the tip of the saw blade 32) follows a curvilinear path, moving both toward the housing 22 (to the right in FIGS. 1 and 2) and downwardly (in the cutting direction 32). During the return stroke (moving from the position shown in FIG. 1 to the position shown in FIG. 2), the tip of the saw blade 32 returns along this curvilinear path (moves away from the housing 22 (to the left in FIGS. 1 and 2) and upwardly (in the non-cutting direction 34)) as the spindle 24 is extended and as the counterweight 26 moves downwardly along the track member 56. The tip of the saw blade 32 thus follows the same curvilinear path in the return stroke and in the cutting stroke.

The neutral, non-rocking motion of the saw blade 32 is illustrated in FIG. 11. During the cutting stroke (from the position shown in solid lines to the position shown in broken lines), the spindle 24 is retracted, and the counterweight 26 moves along the neutrally-positioned track member 56. As a result, the tip of the saw blade 32 follows a linear path, moving only toward the housing 22 (to the right in FIG. 11). During the return stroke (moving from the position shown in broken lines to the position shown in solid lines), the tip of the saw blade 32 returns along this linear path (moving only away from the housing 22 (to the left in FIG. 11)) as the spindle 24 is extended and as the counterweight 26 moves along the neutrally-positioned track member 56. The tip of the saw blade 32 thus follows the same linear path in the return stroke and in the cutting stroke.

Finally, the up-cutting rocking motion of the saw blade 32 is illustrated in FIG. 12. During the cutting stroke (moving from the position shown in solid lines to the position shown in broken lines), the spindle 24 is retracted, and the counterweight 26 moves downwardly along the track member 56. As a result, the tip of the saw blade 32 follows a curvilinear path (different from the curvilinear path illustrated in FIGS. 1 and 2), moving both toward the housing 22 (to the right in FIG. 12) and upwardly. During the return stroke (in FIG. 12, moving from the position shown in broken lines to the position shown in solid lines), the tip of the saw blade 32 returns along this curvilinear path (moves away from the housing 22 (to the left in FIG. 12) and downwardly) as the spindle 24 is extended and as the counterweight 26 moves upwardly along the track member 56. The tip of the saw blade 32 thus follows the same curvilinear path in the return stroke and in the cutting stroke.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of reciprocating a spindle of a reciprocating saw, the spindle having a front end adapted to support a saw blade for reciprocating movement through a path of travel, said method comprising the acts of:

repeatedly reciprocating the front end of the spindle such that the saw blade moves along a first path of travel during a first saw blade cutting stroke and along the same first path of travel during a first saw blade return stroke; and adjusting the path of travel of the spindle such that the front end of the spindle and the saw blade repeatedly reciprocate along a second path of travel during a second saw blade cutting stroke and along the same second path of travel during a second saw blade return stroke, the second path of travel being oblique to the first path of travel;

wherein the saw blade has a first orientation relative to the spindle to have a first cutting direction and a second orientation relative to the spindle to have a second cutting direction opposite the first cutting direction, wherein the first path of travel is characterized by movement at least partially in the first cutting direction during the first saw blade cutting stroke, and wherein said method further comprises the acts of:

adjusting the orientation of the saw blade relative to the spindle from the first orientation to the second orientation; and adjusting the path of travel of the saw blade such that the front end moves along a third path of travel during a third saw blade cutting stroke, the third path of travel being characterized by movement at least partially in the second cutting direction during the third saw blade cutting stroke.

2. A method as claimed in claim 1, wherein the spindle defines a longitudinal extent, and wherein the first path of travel is substantially parallel to the longitudinal extent of the spindle.

3. A method as claimed in claim 1, wherein the spindle defines a longitudinal extent, and wherein the second path of travel is oblique to the longitudinal extent of the spindle.

4. A method as claimed in claim 1, wherein the saw also includes a track and a track follower connected to the saw blade, and wherein said act of reciprocating includes moving the track follower along the track.

5. A method as claimed in claim 4, wherein the spindle is connected to the track follower, and wherein said act of reciprocating includes moving the spindle so that the track follower moves along the track.

6. A method as claimed in claim 4, wherein the saw further includes a counterweight, the counterweight being movably supported and connected to the track follower, and wherein said act of reciprocating includes moving the counterweight so that the track follower moves along the track.

7. A method of reciprocating a spindle of a reciprocating saw, the spindle having a front end adapted to receive a saw blade, the saw blade being movable through a path of travel including a cutting stroke and a return stroke, the saw blade having a first orientation relative to the spindle to have a first cutting direction and a second orientation relative to the spindle to have a second cutting direction opposite the first cutting direction, said method comprising the acts of:

moving the front end along a first cutting path during a first cutting stroke, the first cutting path characterized by movement at least partially in the first cutting direction during the first cutting stroke;

returning the front end along a first return stroke in the same first cutting path;

adjusting the orientation of the saw blade relative to the spindle from the first orientation to the second orientation;

adjusting the path of travel of the saw blade such that the front end moves along a second cutting path during a second cutting stroke, the second cutting path characterized by movement at least partially in the second cutting direction during the second cutting stroke; and returning the front end along a second return stroke in the same second cutting path.

8. A method as claimed in claim 7, further comprising the act of adjusting the path of travel of the saw blade such that the front end moves along a neutral cutting path during the cutting stroke, the neutral cutting path characterized by movement substantially perpendicular to the first and second cutting directions.

9. A method as claimed in claim 7, wherein the saw includes a track and a track follower connected to the saw blade, and wherein said act of reciprocating includes moving the track follower along the track.

10. A method as claimed in claim 9, wherein the spindle is connected to the track follower, and wherein said act of reciprocating includes moving the spindle so that the track follower moves along the track.

11. A method as claimed in claim 9, wherein the saw further includes a counterweight, the counterweight being movably supported and connected to the track follower, and wherein said act of reciprocating includes moving the counterweight so that the track follower moves along the track.

12. A method of reciprocating a spindle of a reciprocating saw, the spindle having a front end adapted to receive a saw blade movable through a cutting stroke and a return stroke, the saw also including a track and a track follower connected to the saw blade, said method comprising the acts of:

positioning the track to define a first path of travel of the saw blade;

moving the track follower along the track on the first path during a first cutting stroke;

moving the track follower along the track on the first path during a first return stroke;

repositioning the track to define a second path of travel of the saw blade, the second path being oblique to the first path;

moving the track follower along the track on the second path during a second cutting stroke; and moving the track follower along the track on the second path during a second return stroke;

wherein the saw blade has a first orientation relative to the spindle to have a first cutting direction and a second orientation relative to the spindle to have a second cutting direction opposite the first cutting direction, wherein the first path of travel is characterized by movement at least partially in the first cutting direction during the first cutting stroke, and wherein said method further comprises the acts of:

adjusting the orientation of the saw blade relative to the spindle from the first orientation to the second orientation; and adjusting the path of travel of the saw blade such that the front end moves along a third path of travel during a third cutting stroke the third path of travel being characterized by movement at least partially in the second cutting direction during the third cutting stroke.

13. A method as claimed in claim 12, wherein the spindle is connected to the track follower, and wherein said act of reciprocating includes moving the spindle so that the track follower moves along the track.

14. A method as claimed in claim 12, wherein the saw further includes a counterweight, the counterweight being movably supported and connected to the track follower, and wherein said act of reciprocating includes moving the counterweight so that the track follower moves along the track.

* * * * *